Patented Apr. 24, 1923.

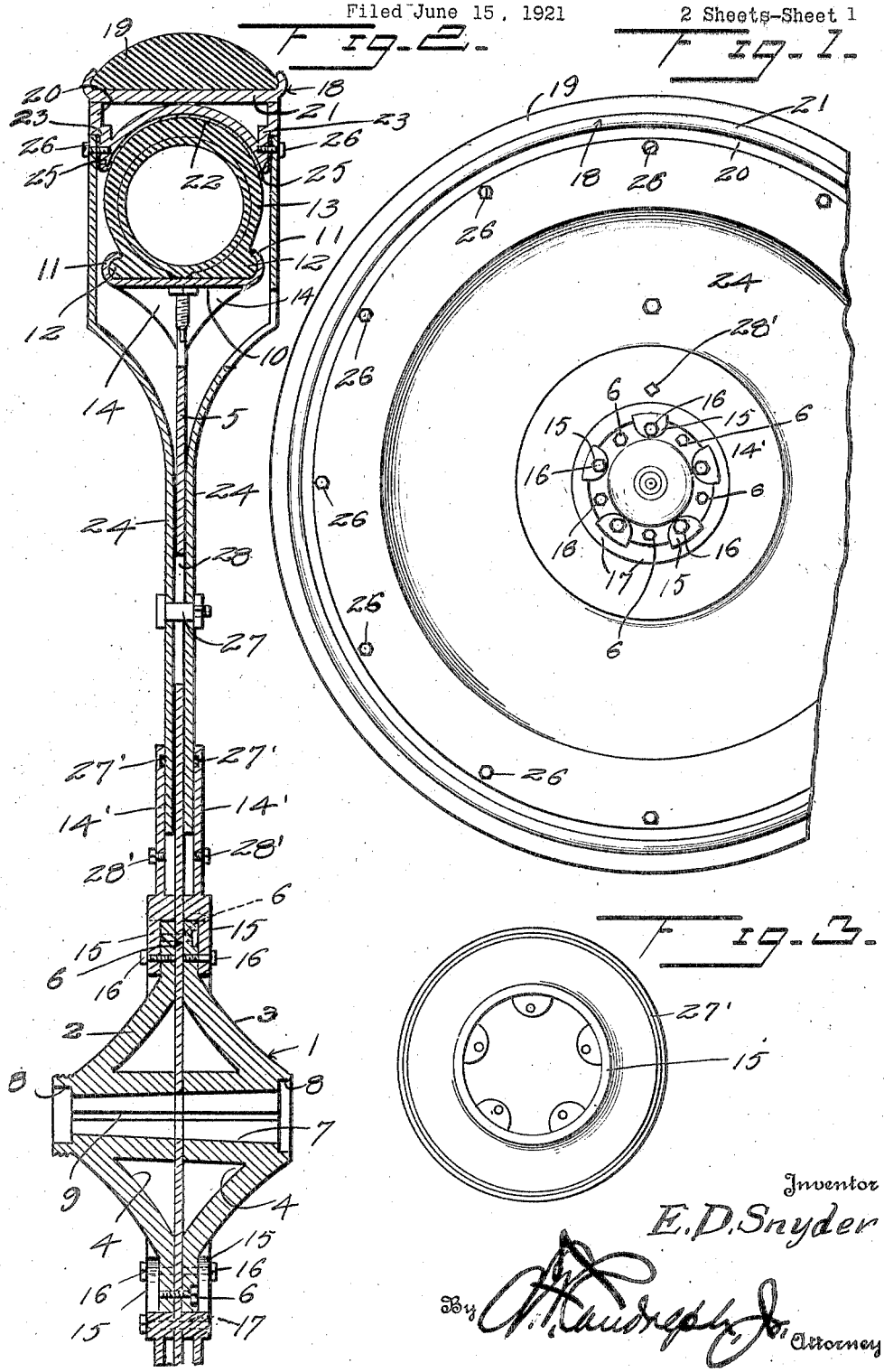

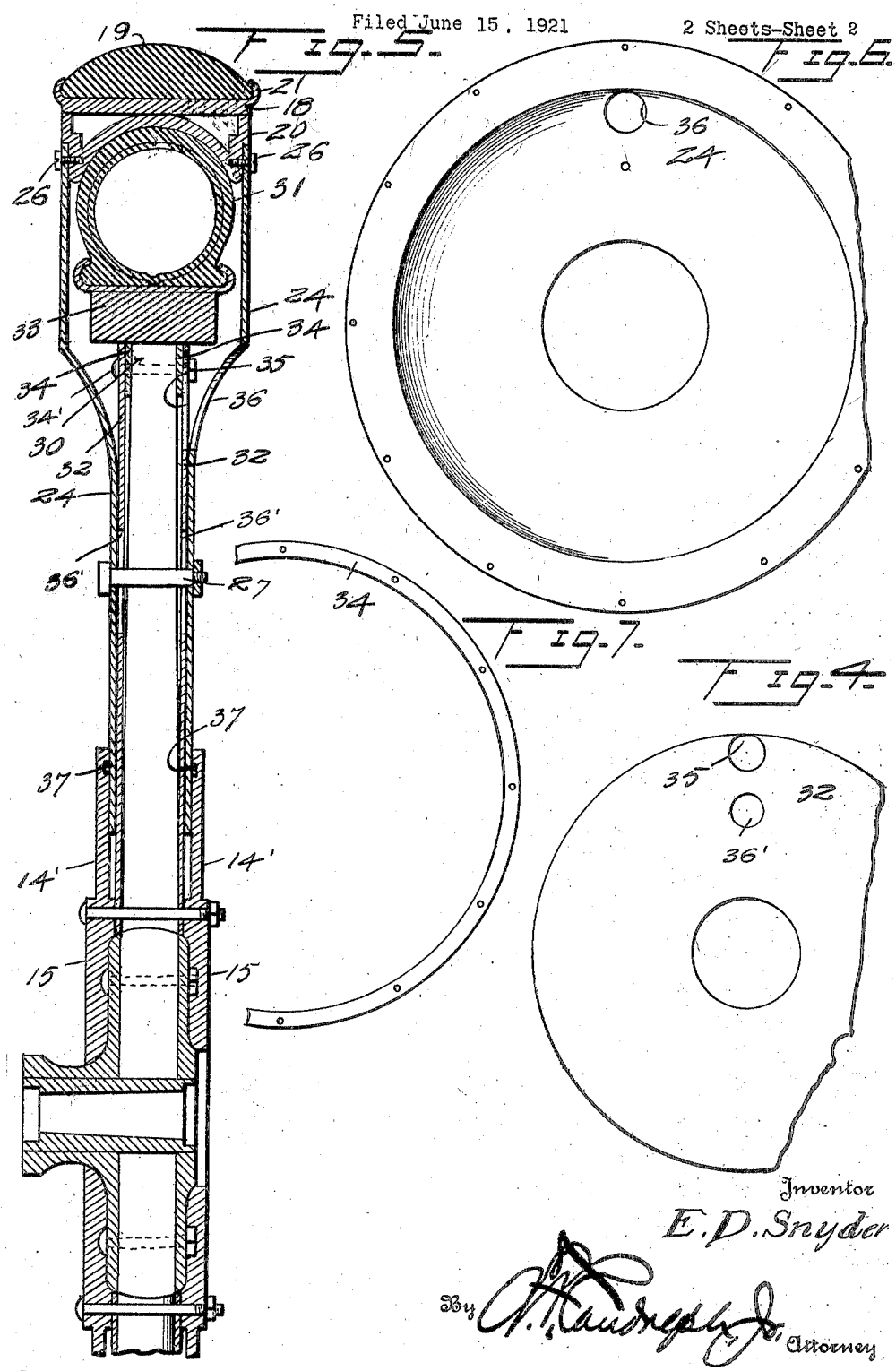

1,453,198

UNITED STATES PATENT OFFICE.

EARL D. SNYDER, OF ALBANY, ILLINOIS.

CUSHION WHEEL.

Application filed June 15, 1921. Serial No. 477,719.

*To all whom it may concern:*

Be it known that I, EARL D. SNYDER, a citizen of the United States, residing at Albany, in the county of Whiteside and State of Illinois, have invented certain new and useful Improvements in Cushion Wheels; and I do hereby declare the following to be a full, clear, and exact description of the invention, such as will enable others skilled in the art to which it appertains to make and use the same.

This invention relates to new and useful improvements in cushion wheels for motor vehicles and has for its primary object the provision of pneumatic means for absorbing shocks and jars and is relieved of road wear by a solid tire, consequently obviating punctures and the expense connected therewith.

Another object of this invention is the provision of a connection between the mounting of the solid tire and the hub of the wheel to permit the former to be driven by the latter when using the wheel on the rear of the motor vehicle and to allow the pneumatic means to have its full cushioning effect and also adapted to exclude dirt and foreign matter from said pneumatic means.

A further object of this invention is the provision of means whereby the solid tire and its mounting may be attached and used in connection with an ordinary wheel having a pneumatic tire to prevent the latter from receiving the road wear and still permit said pneumatic tire to perform its cushioning action.

A still further object of this invention is the provision of a wheel construction of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation, illustrating a cushion wheel constructed in accordance with my invention, Figure 2 is a fragmentary transverse sectional view illustrating the same, Figure 3 is a plan view illustrating one of the hub plates, Figure 4 is a fragmentary plan view illustrating a filling plate of my modified form of invention, Figure 5 is a fragmentary transverse sectional view illustrating my modified form of invention applied to a wheel, Figure 6 is a plan view illustrating a connecting plate between the wheel and the mounting for the solid tire, Figure 7 is a fragmentary plan view illustrating a gasket.

Referring in detail to the drawings, the numeral 1 indicates as an entirety a hub consisting of substantially conical shaped sections 2 and 3 provided with cut out portions 4 to reduce the weight of the hub. The sections 2 and 3 are arranged in abutting engagement and have secured therebetween a supporting disk or filler 5. The sections 2 and 3 are detachably connected together by cap screws 6 and also are connected to the supporting disk or filler 5 by said screws. The disk 3 is provided with openings to permit the cap screws 6 to extend therethrough while the section 2 is provided with screw threaded openings into which the cap screws are threaded after passing through the filler or supporting disk 5. The hub 1 is provided with the usual tapered bore 7 to receive the axle of the vehicle and has ball races 8 adjacent each end. When the hub 1 is employed on the rear axle, the bore of the latter is provided with a key-way 9 to receive the usual key of the rear axle to establish a driving connection between said hub and the axle. The supporting disk 5 has formed upon its periphery a tire supporting rim 10 provided with the usual tire engaging flanges 11 to engage the beads 12 of a pneumatic tire 13. The rim 10 is further secured to the supporting disk 5 by means of braces 14 which extend part way inwardly of the disk and are secured thereto.

Hub plates 14' are arranged on opposite sides of the supporting disk 5 and spaced therefrom and are offset as illustrated at 15 to receive the hub sections 2 and 3 and are secured to the latter by means of cap screws 16. The hub plates 14' at their offset portions 15 are also secured to the supporting disk 5 by cap screws 17. The cap screws 17 extend through plain openings of one of the hub plates and are threaded into openings of the other hub plate after passing through the supporting disk 5.

An outer rim 18 has secured thereto a solid tire 19 constructed of rubber or any other material suitable for the purpose and includes inner and outer sections 20 and 21 which are welded or otherwise secured together and the inner section 20 is concaved to receive the tread portion of the pneumatic tire 13 so as to form an efficient seat therefor. A lining 22 may be interposed between the inner section 20 of the outer rim and the pneumatic tire for the purpose of preventing chafing of the latter. The side walls of the inner section 20 are offset inwardly as illustrated at 23 to receive the outer edges of combined protector and connecting plates 24. Gaskets 25 are interposed between the inner section 20 and the plates 24 and the latter are secured to the inner section 20 by cap screws 26. The plates 24 after passing inwardly of the pneumatic tire 13 and its rim are curved inwardly to extend in close relation to the disk 5 and are slidably received between the hub plates 14'.

The opposing faces of the hub plates 14' adjacent their outer edges are provided with annular grooves in which are seated gaskets 27' adapted to contact with the outer faces of the plates 24 to establish a leak-proof connection between the hub plates 14' and said plates 24 are also adapted to prevent dirt and foreign matter from entering between said plates. The connecting plates 24 are provided with openings to receive a connecting bolt 27 which extends through a comparatively large opening 28 formed in the supporting disk 5 for the purpose of permitting the plates 24 to have a limited relative movement with respect to the supporting disk 5 and said bolt is adapted to contact with the wall of the opening 28 for the purpose of establishing a driving connection between the supporting disk 5 and the outer rim 18. The provision of an opening 28 of a diameter greater than the external diameter of the bolt 27 permits the relative movement between the disk 5 and the outer rim 18 to take care of the expansion and contraction of the pneumatic tire and also forms a driving connection between said parts. The hub plates 14' are provided with oil openings closed by removable plugs 28' so that lubricant may be placed in the space between said hub plates for the purpose of furnishing lubricant to the faces of the hub plates, disk 5 and the plates 24.

Referring to my modified form of invention, an ordinary wheel 30 having an ordinary pneumatic tire 31 mounted thereon is equipped with my invention. The outer rim 18 is seated on the tire 31 and the plates 24 extend inwardly and in close proximity to the spokes of the wheel and are received by the hub plates 14' which are secured to the hub of said wheel. Filler plates 32 are positioned adjacent the spokes of the wheel 30 and are engaged by the plates 24. The filler plates 32 engage the felly 33 of the wheel and a gasket 34 is positioned between said filler plates and the spokes. The fastening bolts 34' which secure the filler plates together also pass through the gaskets 34. One of the filler plates is provided with a cut-out portion 35 adapted to aline with an opening 36 in one of the plates 24 so that a person may readily inflate the pneumatic tire. It is to be understood that one of the plates 24 in my preferred form of invention is provided with an opening to permit the inflation of the pneumatic tire. The filler plates are provided with comparatively large openings 36' to receive the bolt 27 when it is desired to use the wheel for driving purposes. When not using the wheel as a driving medium, the bolt 27 may be dispensed with in both forms of my invention. The hub plates are bolted or otherwise secured to the filler plates 32.

While I have shown and described the preferred embodiment of my invention, it will be understood that minor changes in construction, combination, and arrangement of parts may be made without departing from the spirit and scope of the invention as claimed.

Having thus described my invention what I claim is:

1. A cushion wheel comprising a hub structure including spaced parallel hub plates, a pneumatic tire, supporting means rigidly secured to said hub structure and extending outwardly therefrom and between the hub plate and supporting a tire rim on which said pneumatic tire is mounted, an outer rim resting on said tire, said outer rim consisting of inner and outer sections the inner side of the inner section shaped to conform to the shape of the pneumatic tire and to rest thereon, the outer section of said outer rim carrying a cushion tire, outer plates secured to the outer rim and slidably received by the hub plates, and means loosely securing the outer plates to the supporting means whereby the outer rim and outer plates may move radially in respect thereto.

2. A cushion wheel comprising a hub structure including spaced parallel hub plates, a pneumatic tire, a supporting disk rigidly secured to said hub structure and extending outwardly therefrom and between the hub plates and supporting a tire rim on which said pneumatic tire is mounted, an outer rim resting on said tire, said outer rim consisting of inner and outer sections of which the inner section is shaped to conform to the shape of the pneumatic tire, a liner between the inner section and said tire, the outer section of said outer rim carrying a cushion tire, outer plates secured to the outer rim and slidably received between the hub plates, said supporting disk having enlarged openings therein adapted to receive securing means connecting the outer plates, whereby the outer rim and outer plates may move radially in respect to the supporting rim.

In testimony whereof I affix my signature in presence of two witnesses.

EARL D. SNYDER.

Witnesses:
 THOMAS C. YOPAT,
 MRS. MARY A. SNYDER.